United States Patent [19]
Galloway et al.

[11] 3,919,715
[45] Nov. 11, 1975

[54] EVENT RECORDER WITH RATCHET TAPE ADVANCE

[75] Inventors: William C. Galloway; William T. Harrold, both of Seattle, Wash.

[73] Assignee: G & H Instrumentation, Inc., Seattle, Wash.

[22] Filed: Dec. 5, 1973

[21] Appl. No.: 421,969

[52] U.S. Cl. .......................... 360/6; 360/71; 360/93
[51] Int. Cl.² .................. G01D 15/12; G11B 15/20
[58] Field of Search ..................... 360/6, 52, 93–96, 360/71

[56] References Cited
UNITED STATES PATENTS

| | | | |
|---|---|---|---|
| 2,938,964 | 5/1960 | Collett | 360/6 |
| 3,474,429 | 10/1969 | McCowen | 360/52 |
| 3,627,185 | 1/1970 | Trammell | 360/93 |
| 3,650,263 | 3/1972 | Kowalski | 360/5 |
| 3,688,058 | 8/1972 | Findlay | 360/93 |
| 3,710,359 | 1/1973 | Sawada | 360/52 |
| 3,786,456 | 1/1974 | Crafts | 360/52 |

*Primary Examiner*—Vincent P. Canney
*Assistant Examiner*—Jay P. Lucas
*Attorney, Agent, or Firm*—Seed, Berry, Vernon & Baynham

[57] ABSTRACT

A self-contained recorder utilizing a magnetic tape to record desired events generated as impulse bits. The recorder utilizes an amplifying circuit and a tape advancing solenoid so that the tape is incrementally advanced at a predetermined time sequence with a minimum of power drain. The input resulting from operation of a switch is recorded across the width of the tape and therefore more than one bit may be stored on a given increment of tape. The recorder utilizes a unique means for advancing the tape a predetermined amount, maximizing the utility of a given tape length, includes guide means for the tape such that the events are continuously recorded on one or the other channel and the recordation thereof is definitive.

2 Claims, 5 Drawing Figures

EVENT RECORDER WITH RATCHET TAPE ADVANCE

BACKGROUND OF THE INVENTION

There are many occasions when it is necessary to keep some sort of a record of the passage of events with respect to time so that future planning may be based upon factual information rather than inclination or hunch. One of these areas which is well known to every motorist is the counting of traffic moving by a particular point to decide the necessity for a street light, stop sign or an increase in the size of the roadway.

Another instance where this sort of information is necessary is in the field of water usage. The amount of water flow through a given water line may be measured by placing a transmitter switch upon the meter such that the operation of the meter causes the switch to turn on and off, giving an impulse which may be recorded.

In each of the above cases and many others it would be desirable to have a recorder which is of a compact size, may be left in the recording position for a great length of time, and does not need attendance. Further the unit must be self-contained such that no other external input, with the exception of the function of the switch, is necessary.

With the above noted desires in mind, it is an object of the present invention to provide an event recorder which is lightweight and has a long operational life without an attendant. Because of the economical utilization of the internal battery power the unit may be left in an operative location and condition, for example, for from 6 to 8 months if neccesary.

It is another object of the present invention to provide a recording apparatus which utilizes a magnetic tape which records upon up to four channels. The apparatus may record events on only three channels in the event that it is necessary or desirable to have a time input sequence recorded on the fourth channel for comparative purposes.

It is another object of the present invention to utilize a standard continuous loop tape cartridge for purposes of recording and to guide the tape in a constricted path as it passes the recording head such that the events are consistently and uniformly recorded along a given channel of the tape.

It is another object of the present invention to provide a unique means for driving the tape in predetermined increments such that the utilization of the tape is at its maximum and that the majority of the input bits will be recorded while the tape is stationary. The drive for the tape is of a variable speed whereby the rate of the input bits may be accommodated by adjusting the rate of advance of the tape itself.

DETAILED DESCRIPTION OF THE DRAWINGS

Figure 1:
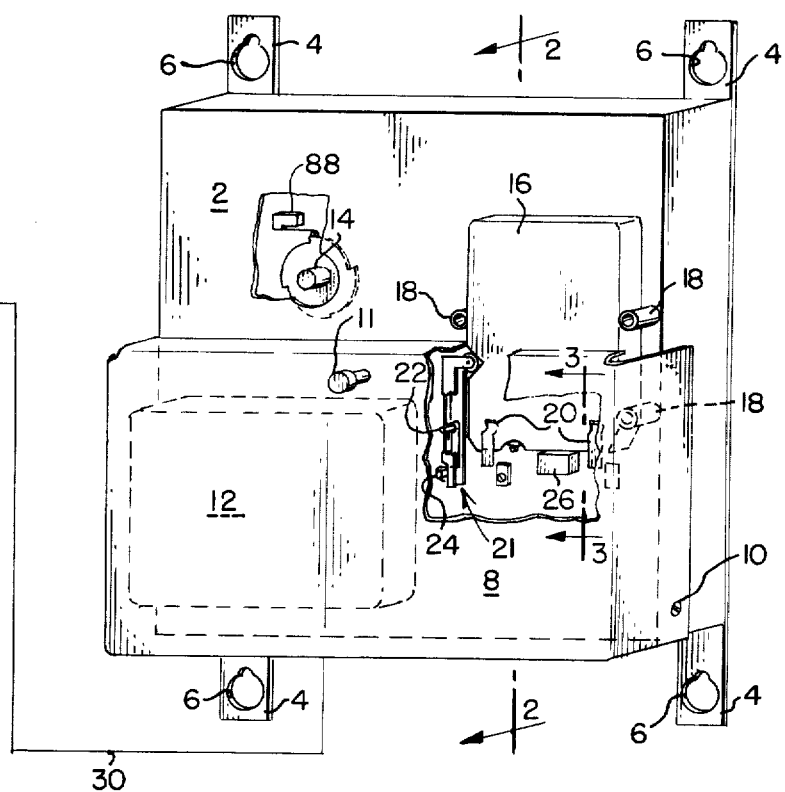
FIG. 1 is an isometric view of the event recorder with a portion broken away showing the relative location of the various main elements as well as a schematic showing of one of many possible inputs.

As seen in FIG. 1 the event recorder comprises a combination protective covering and apparatus supporting means whereby the recorder may be mounted to a vertical member or alternatively laid flat. The cover includes a plurality of outwardly extending ears 4 having keyhole slots 6 whereby the recorder may be immediately attached to prelocated outwardly extending nails, screws or the like. The cover 2 includes an upwardly extending lid 8 providing an area above the main body portion accessible from the top of the unit. This upwardly extending lid portion 8 is pivotally mounted at 10 and can be opened by unthreading thumbscrew 11 permitting immediate access to the battery 12 and the tape recording elements which will be described in greater detail hereinafter.

An adjustable timer 13 in the form of an independent battery driven clock having an outwardly projecting adjusting knob 14 provides timed impulses independent of the events to be recorded against which the frequency of the occurrence of the recorded event may be measured. The timing of the impulses may be varied to accommodate the given input material.

Further to be seen in this figure is a standard continuous loop tape cartridge 16 which is secured in position against the recording head by means of side guides 18, a pair of hold-down clips 20 and a yieldable locking mechanism 21 in the form of a pressure arm assembly having a pivot point 22, a cartridge contacting wheel, and a post 24 for securing the spring which continuously urges the pressure arm assembly into contact with a notch in the cartridge 16 for releasably biasing the cartridge tape and pinch roller against the capstan 70 in a well known manner.

As will be described in greater detail hereinafter, the recording head 26 is located so that it will be in contact with the tape as necessary for accurate recordation. For purposes of illustration a water meter 28 is shown as an input source. The meter has mounted thereon a conventional flow spring switch 82, not shown in detail, having a micro switch that is closed each time a predetermined number of cubic feet of water, for example, pass through the meter. Closing the micro switch by the flow of water provides an impulse to recording head A via line 30. Similar switches 84 and 86 can provide impulses from other meters.

Figure 2:
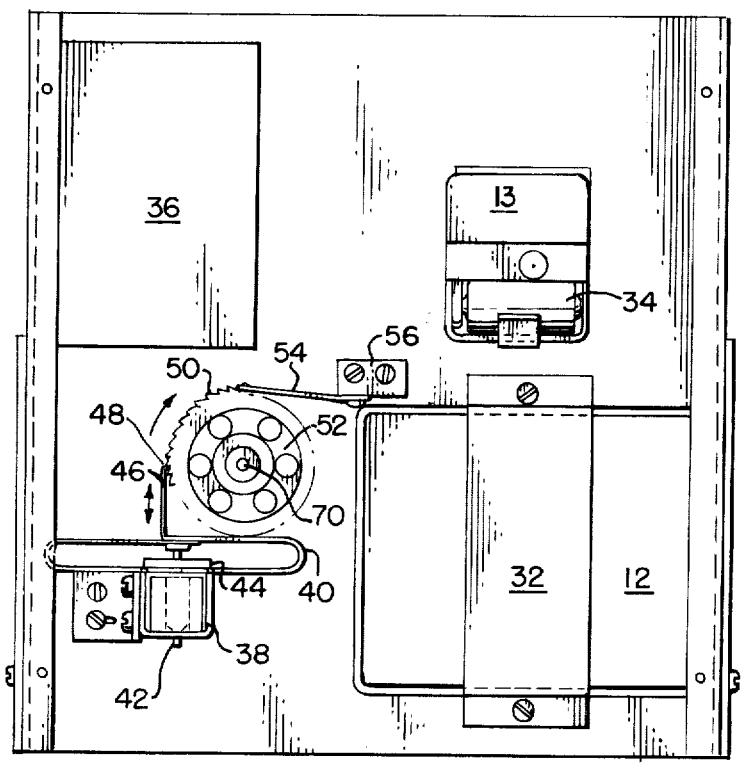
FIG. 2 is a rear elevational view of the event recorder showing the tape drive mechanism.

Referring now to FIG. 2, it can be seen that the drive mechanism for the tape is of a simple yet extremely efficient configuration. Also to be seen in this figure are the bottom of the battery 12 secured in position by means of a strap 32, and the underside of the timer mechanism 13 which includes its own operating battery 34.

A circuit plate 36 may also be seen wherein the wiring necessary for the operation is located in a compact form. The circuitry will be described with respect to the schematic FIG. 4.

As noted above, the tape is driven in incremental steps in a predetermined timed sequence. The predetermined timed sequence is generated by a timing circuit 94 and operates to move the actuating arm 42 of a solenoid 38 against the force of a drive spring 40. The drive spring 40 is in the form of a continuous loop extending over the actuating shaft 42 of the solenoid 38.

Figure 2A:
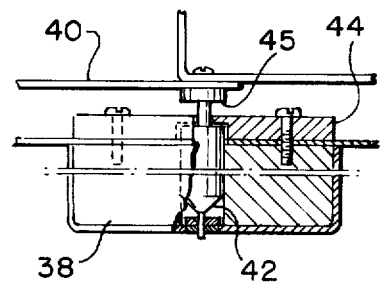
FIG. 2A is a detail of a portion of the recorder.

One end of the shaft 42 is secured to the inner surface of the side of the loop 40 farthest from the solenoid 38 and extends through the side of the loop 40 closest to the solenoid 38 without interference therewith. A shim or stop 44 is seated in a notch 45 in the actuating arm 42 (FIG. 2A). The stop is secured to the solenoid 38 and is of a thickness relative to the longitudinal length of the notch 45 sufficient to allow movement of a pawl 46 about the distance of a tooth and one half on a drive wheel 52. Energization of the solenoid retracts the actuator 42 downwardly deflecting the spring 40 until the top of notch 45 strikes the shim 44. When the solenoid is deenergized spring 40 moves pawl 46 until the bottom of the notch 45 engages the shim thus advancing the wheel 52 through the distance of only one tooth. To prevent reverse motion of the wheel 52 upon return of the solenoid to its original position, a wire spring loop 54 secured to the base member at 56 is biased against the teeth 50.

Figure 3:
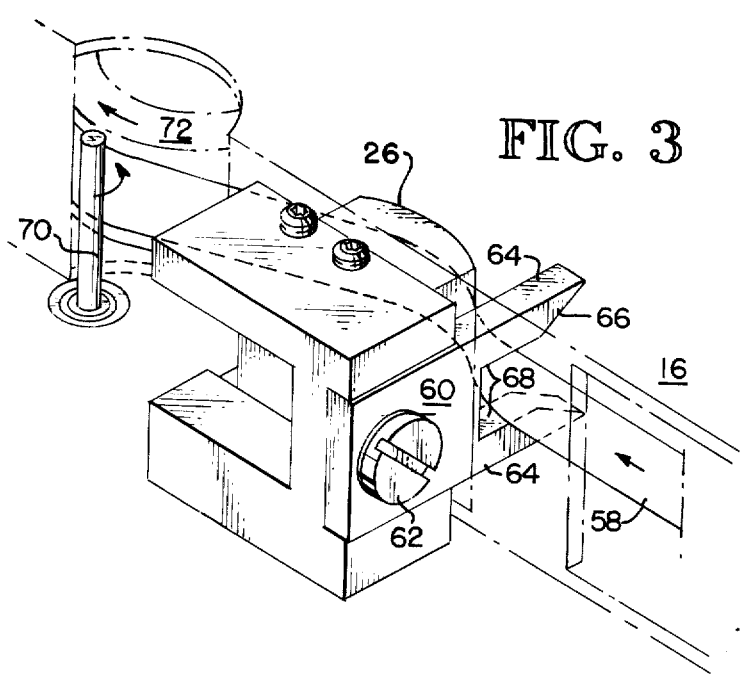
FIG. 3 is an enlarged view of the tape drive and tape guide mechanism in conjunction with the recording head.

Referring now to FIG. 3, the recording head 26 may be seen in greater detail. The tape 58 which is stored in a continuous loop in cartridge 16 passes by the recording head 26 and has the impulses magnetically recorded thereon in a fashion well known in the art. To assure that each of the impulses is properly located transversely with respect to the tape itself guide means 60 is secured to the tape head by threaded element 62. Guide means 60 has a pair of parallel outwardly projecting arms 64 having tapered inner surfaces 66 to assist in placing the tape properly within the guide means 60. The distance between the parallel inner surfaces 68 of the guide means 60 is slightly greater than the width of the tape 58 such that the tape 58 is continuously accurately guided over the recording head consistently at the same relative location. This guidance assures that the events from each input line are consistently recorded upon a single transversely spaced channel of the tape. A conventional capstan 70 extends outwardly through the upper portion of the housing and operates in conjunction with a wheel 72 located within the cartridge 16 to incrementally drive the tape 58. The drive for the capstan, as explained hereinabove, is the wheel 52 operated by the solenoid 38.

Figure 4:
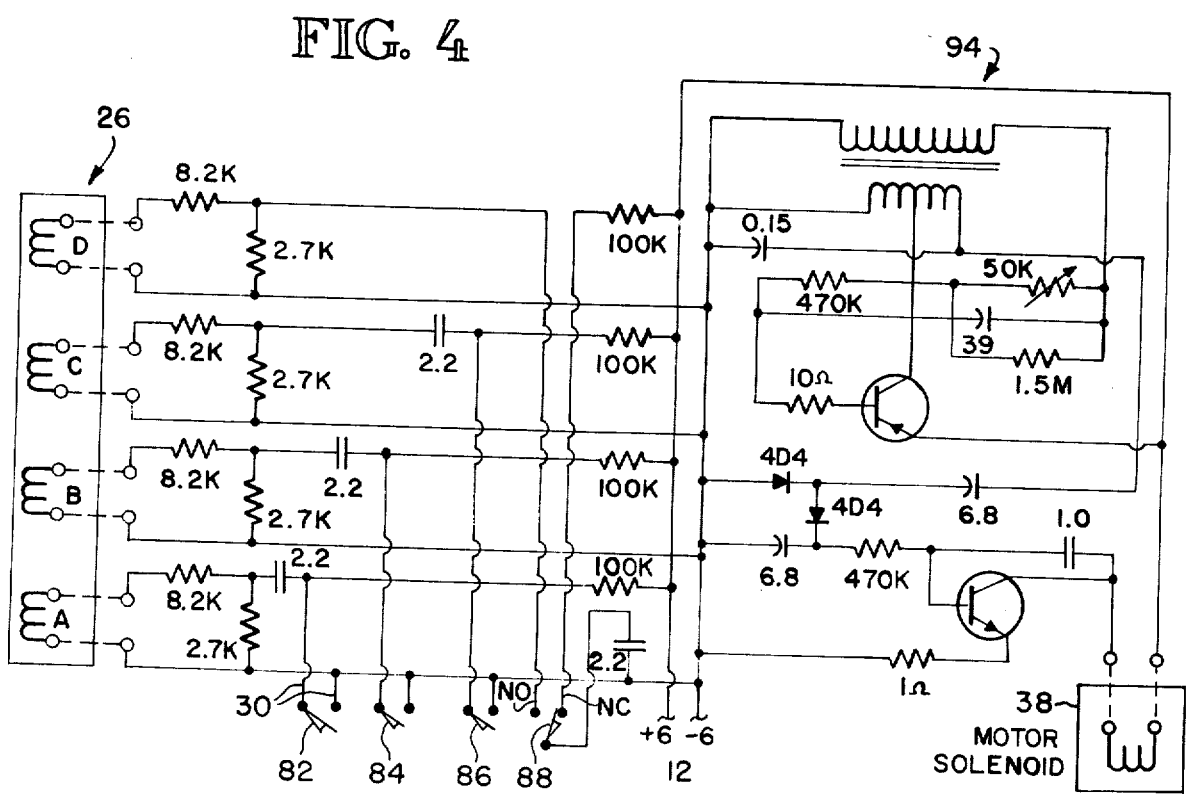
FIG. 4 is a schematic representation of the circuitry employed in the invention.

The schematic diagram rendering the entire recording element operational is shown in FIG. 4 wherein the channel recording head 26 is depicted on the left. Switches 82, 84, 86 which provide the necessary data input are shown at the bottom portion of the diagram as is the clock operated micro switch 88.

As is readily apparent 2.2 microfarad capacitors in the channels A, B, C and D circuits are charged by the 6 volt battery 12. Each closing of switch 82, for example, discharges the capacitor through the recording coil of channel A putting a magnetic impulse on the tape. Simultaneously, the clock switch contact 88 is being opened periodically to discharge the capacitor in the circuit of channel D to put an impulse on the tape at channel D. By dividing the number of flow indicating pulses by the number of timing pulses an operator can ascertain the flow rate through the meter, if desired. By slowly charging the capacitors and discharging them through their recording coils when the switches 82, 84, 86 and 88 are closed, battery drain is minimized, switching noise is easily filtered and accurate control of the voltage is provided for magnetizing the tape through the recording heads.

The timing circuit 94 employs a conventional oscillator circuit for providing multiple pulse cycles spaced in approximately three second intervals. The voltage of the cycles is doubled in a voltage doubling circuit and finally amplified to provide a 15–20 millisecond pulse to energize the solenoid 38.

Thus, it can be seen that the small incremental advancement of the tape as well as utilization of all four channels of a recording tape permit the longtime unattended operation of the present mechanism since the battery has an extended life. The concentration of the input bits upon the tape likewise enables the tape itself to be left unattended for great periods of time. The recorder operates by incremental advancement, and one set of data can be recorded on four channels for each advance of the tape. The specific recorder utilized, permits the advance rate to be adjustable from 0.1 second per advance to greater than 4 seconds per advance. The bit is applied to the tape by means of a short current pulse and although the recording is normally accomplished while the tape is stationary, pulses applied to the recording head while the tape is transporting will be faithfully recorded. Individual bits are spaced at 0.0015 inch and therefore the maximum density when all four channels are used is in excess of 2500 bits per inch of tape. The method of transporting the magnetic tape utilizing low power consumption permits a standard battery to operate in excess of one year if necessary.

The embodiments of the invention in which an exclusive property or privilege is claimed are defined as follows:

1. A self-contained event recorder utilizing a magnetic tape to record the desired events and capable of continuous unattended operation, comprising:
   enclosing and supporting means,
   recording head means having a plurality of tracks mounted to the enclosing and supporting means,
   means to secure a tape cartridge in an operational position adjacent the recording head means,
   guide means adjacent the recording head means assuring accurate and consistent placement of a tape relative to the recording head means, thereby obtaining maximum utilization of the tape surface,
   clock means secured to the enclosing and supporting means and adapted to give a time reference signal upon one track of the tape,
   recording means responsive to the occurrence of the event for generating an impulse recorded upon the tape independent of the motion of the tape whereby impulses are recorded on the tape as events occur regardless of the motion of the tape, and
   tape advancing means for periodically advancing the tape having a capstan secured to a ratchet wheel and a springbiased pawl actuated by a solenoid which engages the ratchet wheel such that movement of the pawl rotates the wheel, said pawl being secured to one side of an oblong, resilient member, the shaft of the solenoid extending through the other side of the resilient member and operating against the resilient member to drive the ratchet wheel by means of the pawl whereby the tape advancing means utilizes energy only upon the energization of the solenoid.

2. The event recorder of claim 1 wherein the ratchet wheel is rotated while the pawl is being restored to its energized position by the oblong, resilient member and wherein one of the internal surfaces of the oblong, resilient member has secured thereto a spacer for limiting the distance between adjacent sides of the resilient member during energization of the solenoid, said spacer having a thickness such that the actuator cam move the pawl only between one and two teeth on said wheel, whereby the wheel is accurately indexed each time the solenoid is cycled.

* * * * *